US008232987B2

(12) United States Patent
Park et al.

(10) Patent No.: US 8,232,987 B2
(45) Date of Patent: Jul. 31, 2012

(54) METHOD FOR COMPENSATING VOLTAGE DROP OF DISPLAY DEVICE, SYSTEM FOR VOLTAGE DROP COMPENSATION AND DISPLAY DEVICE INCLUDING THE SAME

(75) Inventors: Kyong-Tae Park, Suwon-si (KR); Young-Il Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 623 days.

(21) Appl. No.: 12/505,392

(22) Filed: Jul. 17, 2009

(65) Prior Publication Data

US 2010/0149162 A1 Jun. 17, 2010

(30) Foreign Application Priority Data

Dec. 12, 2008 (KR) ........................ 10-2008-0126768

(51) Int. Cl.
*G06F 3/038* (2006.01)
*G09G 5/00* (2006.01)

(52) U.S. Cl. .......... 345/214; 345/77; 345/204; 345/212; 345/76; 345/690; 345/89

(58) Field of Classification Search ........... 345/1.1–111, 345/204–215, 690–699
See application file for complete search history.

(56) References Cited

U.S. PATENT DOCUMENTS 5,093,654 A * 3/1992 Swift et al. ...................... 345/76
6,229,508 B1 * 5/2001 Kane .............................. 345/82
6,473,065 B1 * 10/2002 Fan ................................ 345/82
6,943,761 B2 * 9/2005 Everitt ............................ 345/82
6,963,321 B2 * 11/2005 Everitt ............................ 345/82
6,989,636 B2 * 1/2006 Cok et al. ................... 315/169.3
7,239,308 B2 * 7/2007 Satoh et al. ................... 345/204
7,301,618 B2 * 11/2007 Cok et al. ....................... 356/218
7,403,175 B1 * 7/2008 Dunphy et al. .............. 345/75.1
7,791,584 B2 * 9/2010 Korcharz et al. ............. 345/101
7,872,619 B2 * 1/2011 Miller et al. ..................... 345/77
7,880,753 B2 * 2/2011 Shingai et al. ................ 345/690
7,969,430 B2 * 6/2011 Korcharz et al. ............. 345/211
7,973,745 B2 * 7/2011 Mizukoshi et al. ............. 345/76
8,013,814 B2 * 9/2011 Cok et al. ......................... 345/77
(Continued)

FOREIGN PATENT DOCUMENTS

JP 2004-279792 10/2004
(Continued)

*Primary Examiner* — Lun-Yi Lao
*Assistant Examiner* — Gene W Lee
(74) *Attorney, Agent, or Firm* — Innovation Counsel LLP

(57) ABSTRACT

The present invention relates to a method for compensating voltage drop of a display device, a system for voltage drop compensation, and a display device including the same. A method for compensating a voltage drop of a display device including a display panel, a maximum compensation voltage table MLEC LUT for voltage compensation when a voltage drop is a maximum in the display panel, and a voltage drop coefficient table LEC LUT representing voltage drop coefficients with respect to total output currents during one frame according to an embodiment of the present invention comprises: receiving an input image signal; gamma-converting the input image signal to obtain a pre-compensation data voltage; obtaining a first total output current flowing in all pixels PX of the display panel during one frame based on the input image signal; obtaining a first voltage drop compensation voltage V_LEC based on the voltage drop coefficient table LEC LUT and the maximum compensation voltage table MLEC LUT; and adding the first voltage drop compensation voltage V_LEC to the pre-compensation data voltage to obtain the post-compensation data voltage.

21 Claims, 6 Drawing Sheets

U.S. PATENT DOCUMENTS

| | | | | |
|---|---|---|---|---|
| 8,013,826 | B1* | 9/2011 | Fan | 345/91 |
| 8,022,911 | B1* | 9/2011 | Fan | 345/91 |
| 8,035,584 | B2* | 10/2011 | Jung | 345/76 |
| 2001/0015711 | A1* | 8/2001 | Aoki | 345/92 |
| 2003/0016189 | A1* | 1/2003 | Abe et al. | 345/55 |
| 2003/0030654 | A1* | 2/2003 | Sagano et al. | 345/660 |
| 2003/0063110 | A1* | 4/2003 | Sagano et al. | 345/694 |
| 2003/0107542 | A1* | 6/2003 | Abe et al. | 345/89 |
| 2003/0122759 | A1* | 7/2003 | Abe et al. | 345/89 |
| 2003/0169219 | A1* | 9/2003 | LeChevalier | 345/84 |
| 2003/0210211 | A1* | 11/2003 | Moon | 345/75.2 |
| 2004/0263442 | A1* | 12/2004 | Shingai et al. | 345/76 |
| 2005/0116902 | A1 | 6/2005 | Miyzawa | |
| 2005/0179854 | A1* | 8/2005 | Sekine et al. | 349/161 |
| 2005/0280611 | A1* | 12/2005 | Abe et al. | 345/74.1 |
| 2006/0007202 | A1* | 1/2006 | Satoh et al. | 345/204 |
| 2006/0038836 | A1* | 2/2006 | Abe et al. | 345/690 |
| 2006/0097980 | A1* | 5/2006 | Hasegawa | 345/102 |
| 2006/0139278 | A1* | 6/2006 | Shingai et al. | 345/92 |
| 2006/0187151 | A1* | 8/2006 | Ooishi et al. | 345/74.1 |
| 2007/0030228 | A1* | 2/2007 | Chow | 345/89 |
| 2007/0091049 | A1* | 4/2007 | Cho | 345/98 |
| 2007/0103411 | A1* | 5/2007 | Cok et al. | 345/82 |
| 2007/0171163 | A1* | 7/2007 | Miyata | 345/87 |
| 2007/0195024 | A1* | 8/2007 | Korcharz et al. | 345/82 |
| 2007/0195025 | A1* | 8/2007 | Korcharz et al. | 345/82 |
| 2007/0211045 | A1* | 9/2007 | Shingai et al. | 345/204 |
| 2008/0049050 | A1* | 2/2008 | Sagano et al. | 345/690 |
| 2008/0055288 | A1 | 3/2008 | Kawada et al. | |
| 2008/0068320 | A1* | 3/2008 | Kim et al. | 345/89 |
| 2008/0100542 | A1* | 5/2008 | Miller et al. | 345/77 |
| 2008/0122758 | A1 | 5/2008 | Kim et al. | |
| 2008/0170004 | A1* | 7/2008 | Jung | 345/76 |
| 2008/0204483 | A1* | 8/2008 | Abe et al. | 345/690 |
| 2009/0009450 | A1* | 1/2009 | Abe et al. | 345/87 |
| 2009/0051628 | A1* | 2/2009 | Kwon | 345/77 |
| 2009/0085927 | A1* | 4/2009 | Jung | 345/606 |
| 2009/0207106 | A1* | 8/2009 | Mizukoshi et al. | 345/76 |
| 2010/0225634 | A1* | 9/2010 | Levey et al. | 345/212 |

FOREIGN PATENT DOCUMENTS

| | | |
|---|---|---|
| JP | 2004-361754 | 12/2004 |
| JP | 2007-156045 | 6/2007 |
| KR | 10-2006-0061128 | 6/2006 |
| KR | 10-2006-0114131 | 11/2006 |
| KR | 10-2008-0028222 | 3/2008 |
| KR | 10-0833758 | 5/2008 |
| KR | 10-2008-0082279 | 9/2008 |

* cited by examiner

METHOD FOR COMPENSATING VOLTAGE DROP OF DISPLAY DEVICE, SYSTEM FOR VOLTAGE DROP COMPENSATION AND DISPLAY DEVICE INCLUDING THE SAME

CROSS-REFERENCE TO RELATED APPLICATION

This application claims priority to and the benefit of Korean Patent Application No. 10-2008-0126768 filed in the Korean Intellectual Property Office on Dec. 12, 2008, the entire contents of which are incorporated herein by reference.

BACKGROUND OF THE INVENTION (a) Field of the Invention

The present invention relates to a method for compensating a voltage drop of a display device, a system for voltage drop compensation and a display device including the same.

(b) Description of the Related Art

In general, an active matrix flat panel display includes a plurality of pixels arranged in a matrix, a thin film transistor (TFT), which is a three terminal element, for switching a voltage applied to each pixel, and an electro-optic converting element for converting an electrical signal to light. A display device displays images by controlling luminance of each pixel, which is outputted through the electro-optic converting element, according to given luminance information. Each pixel displays one of primary colors, red (R), green (G), and blue (B), and expresses a predetermined color by a spatial or temporal sum of the primary colors.

A display device includes a display panel provided with several voltage lines for driving. However driving voltages may not be uniformly transmitted according to positions on the display panel because of influences such as resistances of the driving voltage lines and RC delay, and a voltage drop may increase as the position is further away from a driver. Particularly, in a case of an organic light emitting device which is driven by a current, the difference of the voltage drop according to positions on the display panel appears as non-uniform luminance and color, thereby decreasing the display quality.

The above information disclosed in this Background section is only for enhancement of understanding of the background of the invention and therefore it may contain information that does not form the prior art that is already known in this country to a person of ordinary skill in the art.

SUMMARY OF THE INVENTION

A method for compensating a voltage drop of a display device including a display panel, a maximum compensation voltage table MLEC LUT for voltage compensation when a voltage drop is maximum in the display panel, and a voltage drop coefficient table LEC LUT representing voltage drop coefficients with respect to total output currents during one frame according to an embodiment of the present invention, includes: receiving an input image signal; gamma-converting the input image signal to obtain a pre-compensation data voltage; obtaining a first total output current flowing in all pixels PX of the display panel during one frame based on the input image signal; obtaining a first voltage drop compensation voltage V_LEC based on the voltage drop coefficient table LEC LUT and the maximum compensation voltage table MLEC LUT; and adding the first voltage drop compensation voltage V_LEC to the pre-compensation data voltage to obtain a post-compensation data voltage.

The obtaining of the first voltage drop compensation voltage V_LEC may comprise obtaining a first voltage drop coefficient LEC corresponding to the first total output current from the voltage drop coefficient table LEC LUT, obtaining a first maximum compensation voltage V_MLEC from the maximum compensation voltage table MLEC LUT, and multiplying the first maximum compensation voltage V_MLEC by the first voltage drop coefficient LEC.

Obtaining the XY coordinates of the input image signal in the display panel may be further included.

The obtaining of the first maximum compensation voltage V_MLEC may comprise obtaining the first maximum compensation voltage V_MLEC corresponding to the XY coordinates of the input image signal using the maximum compensation voltage table MLEC LUT.

The maximum compensation voltage table MLEC LUT may comprise a maximum compensation voltage for a position of a portion of the display panel.

The obtaining of the first maximum compensation voltage V_MLEC corresponding to the XY coordinates of the input image signal may comprise using interpolation.

Providing gamma data may be further comprised, and the obtaining of the pre-compensation data voltage based on the input image signal may comprise using the gamma data.

The gamma data may be separately provided for each primary color including red, green, and blue.

At least one of the maximum compensation voltage table MLEC LUT and the voltage drop coefficient table LEC LUT may be separately provided for each primary color including red, green, and blue.

A system for a voltage drop compensation according to an embodiment of the present invention comprises: a current adder receiving an input image signal and obtaining a first total output current flowing in all pixels PX of a display panel during one frame; a coefficient calculator obtaining a first voltage drop coefficient LEC corresponding to the first total output current using a voltage drop coefficient table LEC LUT representing voltage drop coefficients with respect to total output currents during one frame; a maximum compensation voltage calculator obtaining a first maximum compensation voltage V_MLEC using a maximum compensation voltage table MLEC LUT for voltage compensation when a voltage drop of the display panel is a maximum; a multiplier multiplying the first maximum compensation voltage V_MLEC by the first voltage drop coefficient LEC to obtain a first voltage drop compensation voltage V_LEC; and an adder receiving a pre-compensation data voltage and adding the first voltage drop compensation voltage V_LEC to the pre-compensation data voltage to obtain a post-compensation data voltage.

An XY position calculator receiving the input image signal to obtain XY coordinates of the input image signal in the display panel may be further comprised.

The first maximum compensation voltage V_MLEC may be a maximum compensation voltage corresponding to the XY coordinates of the input image signal.

The maximum compensation voltage table MLEC LUT may comprise a maximum compensation voltage for a position of a portion of the display panel.

The maximum compensation voltage calculator may obtain the first maximum compensation voltage V_MLEC through interpolation using the maximum compensation voltage table MLEC LUT.

The current adder may use gamma data.

At least one of the maximum compensation voltage table MLEC LUTF and the voltage drop coefficient table LEC LUT may be separately provided for each primary color including red, green, and blue.

A display device according to an embodiment of the present invention comprises: a display panel; a data driver transmitting a data voltage to the display panel; a memory storing a voltage drop coefficient table LEC LUT representing voltage drop coefficients with respect to total output currents during one frame, and a maximum compensation voltage table MLEC LUT for voltage compensation when a voltage drop of the display panel is a maximum; a gamma converter receiving an input image signal and gamma-converting the input image signal into a pre-compensation data voltage; a voltage drop compensation system obtaining a first voltage drop compensation voltage (V_LEC) according to an XY position in the display panel using the voltage drop coefficient table LEC LUT and the maximum compensation voltage table MLEC LUT, and adding the first voltage drop compensation voltage V_LEC to the pre-compensation data voltage to generate a post-compensation data voltage; and a signal controller processing the post-compensation data voltage to generate a data voltage and outputting the data voltage to the data driver.

The voltage drop compensation system may comprise: a current adder receiving an input image signal and obtaining a first total output current flowing in all pixels PX of the display panel during one frame; a coefficient calculator obtaining a first voltage drop coefficient LEC corresponding to the first total output current using a voltage drop coefficient table LEC LUT representing voltage drop coefficients with respect to the total output currents during one frame; a maximum compensation voltage calculator obtaining a first maximum compensation voltage V_MLEC using a maximum compensation voltage table MLEC LUT for voltage compensation when a voltage drop of the display panel is a maximum; a multiplier multiplying the first maximum compensation voltage V_MLEC by the first voltage drop coefficient LEC to obtain a first voltage drop compensation voltage V_LEC; and an adder receiving the pre-compensation data voltage and adding the first voltage drop compensation voltage V_LEC to the pre-compensation data voltage to obtain a post-compensation data voltage.

The voltage drop compensation system may further comprise an XY position calculator receiving the input image signal to obtain XY coordinates of the input image signal in the display panel.

The memory may further store gamma data for converting the input image signal into the pre-compensation data voltage.

At least one of the maximum compensation voltage table MLEC LUT and the voltage drop coefficient table LEC LUT may be separately provided for each primary color including red, green, and blue.

DETAILED DESCRIPTION OF THE EMBODIMENTS

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Now, a display device according to an embodiment of the present invention will be described with reference to FIG. 1 to FIG. 8.

Figure 1:
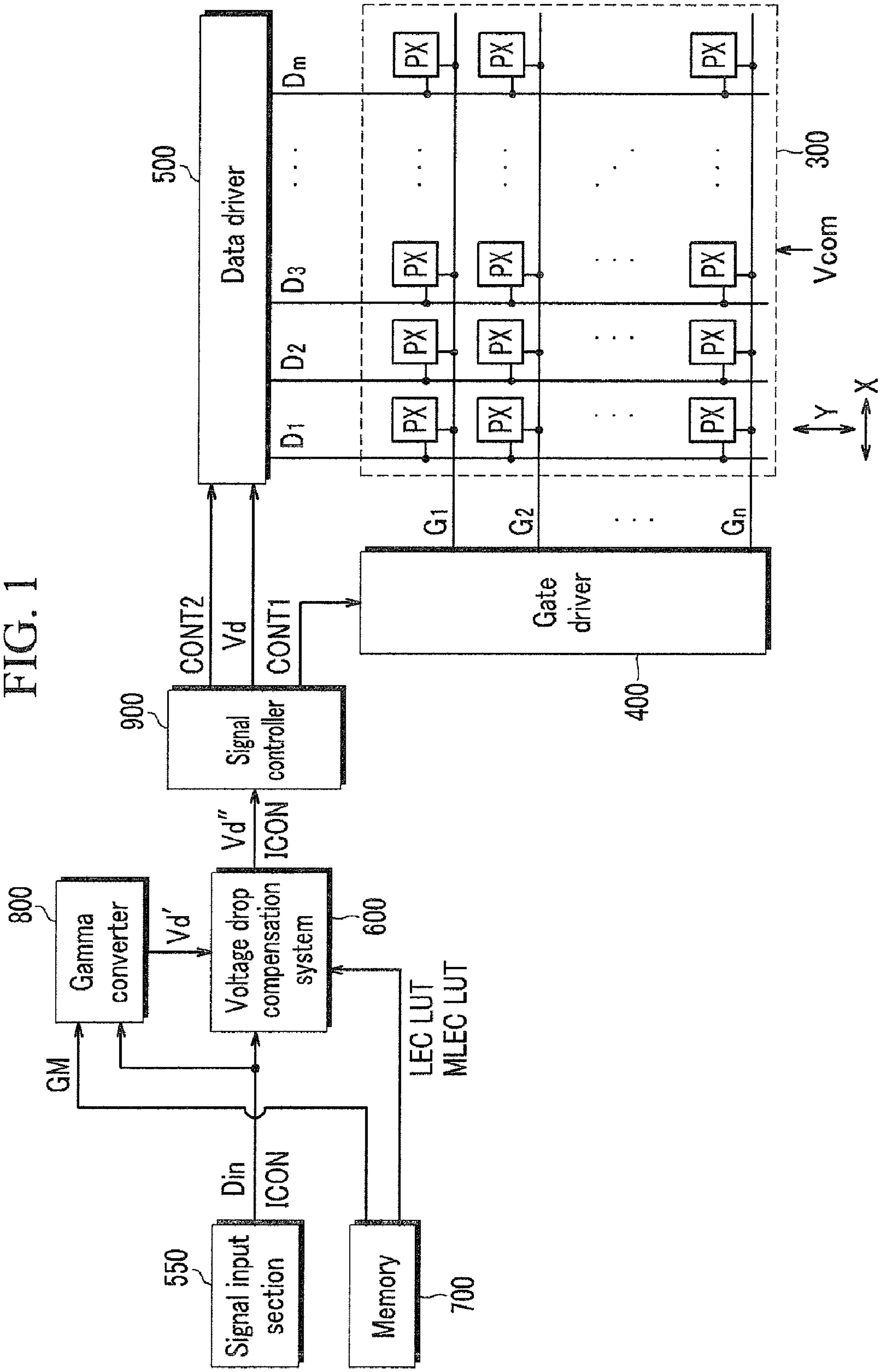
FIG. 1 is a block diagram of a display device according to an embodiment of the present invention.
Figure 2:
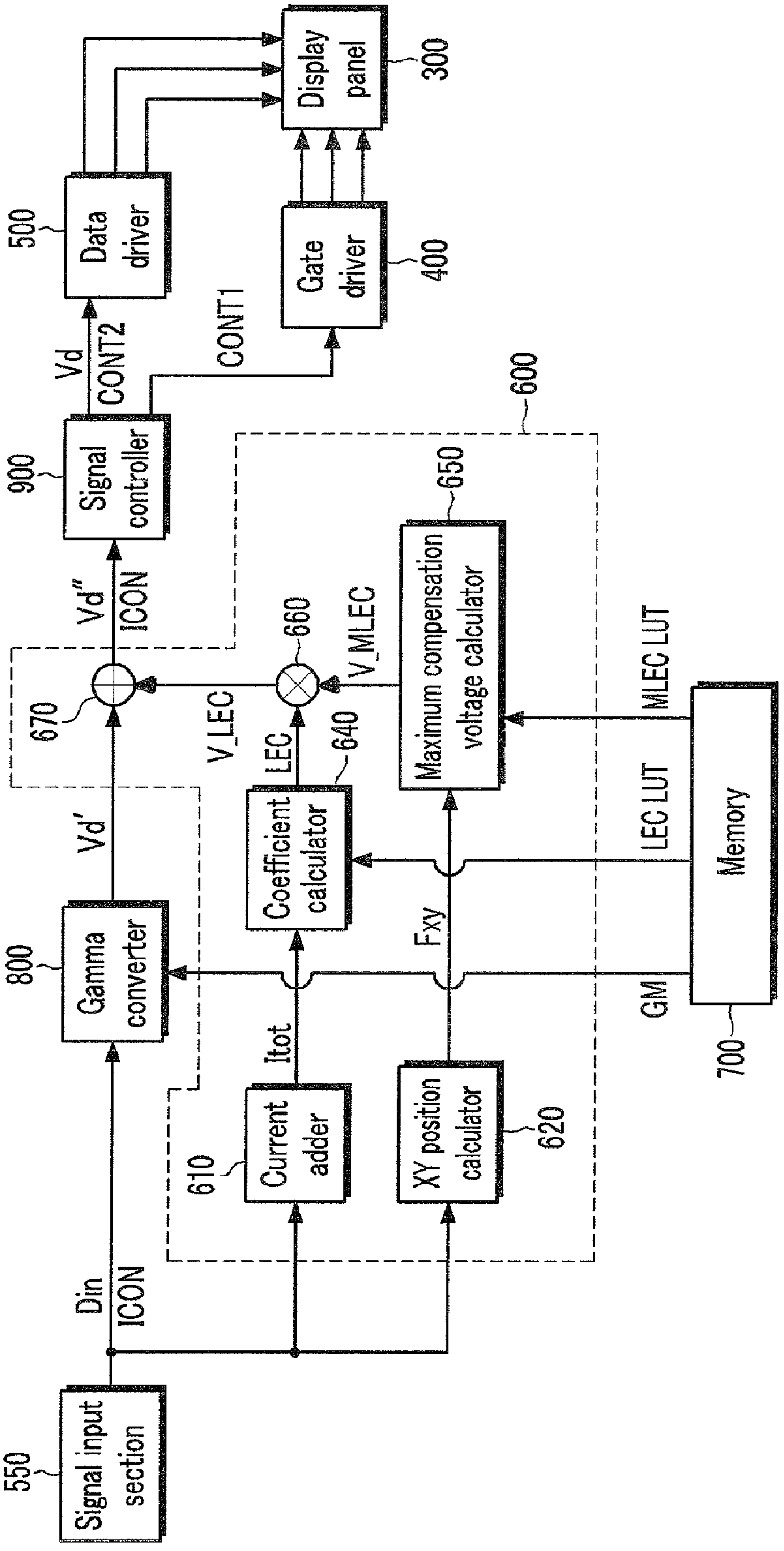
FIG. 2 is a block diagram showing a voltage drop compensation system of a display device according to an embodiment of the present invention.
Figure 3:
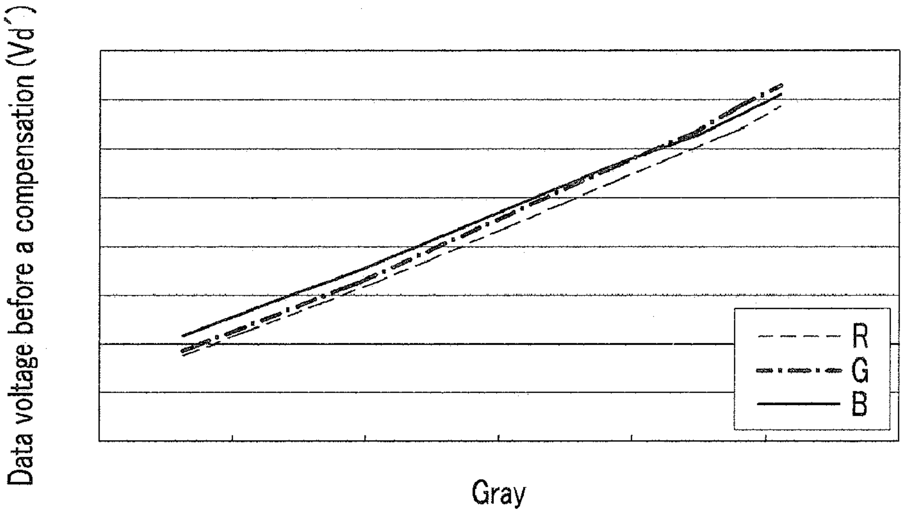
FIG. 3 is a graph showing gamma data for red, green, and blue.
Figure 4:
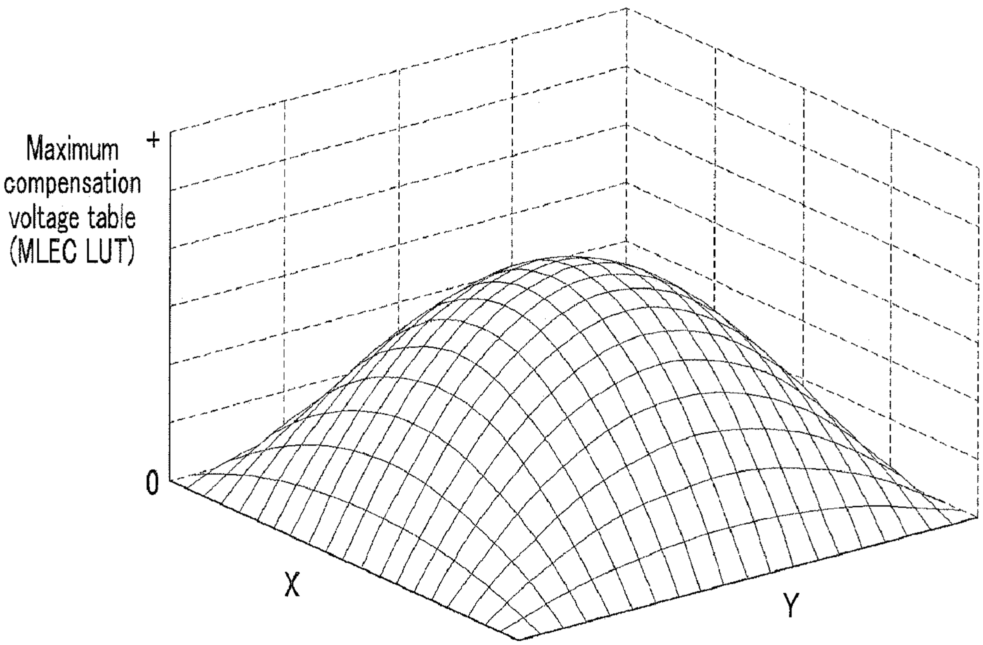
FIG. 4 and FIG. 5 are graphs showing maximum compensation voltages according to XY positions of a display device according to an embodiment of the present invention.
Figure 5:
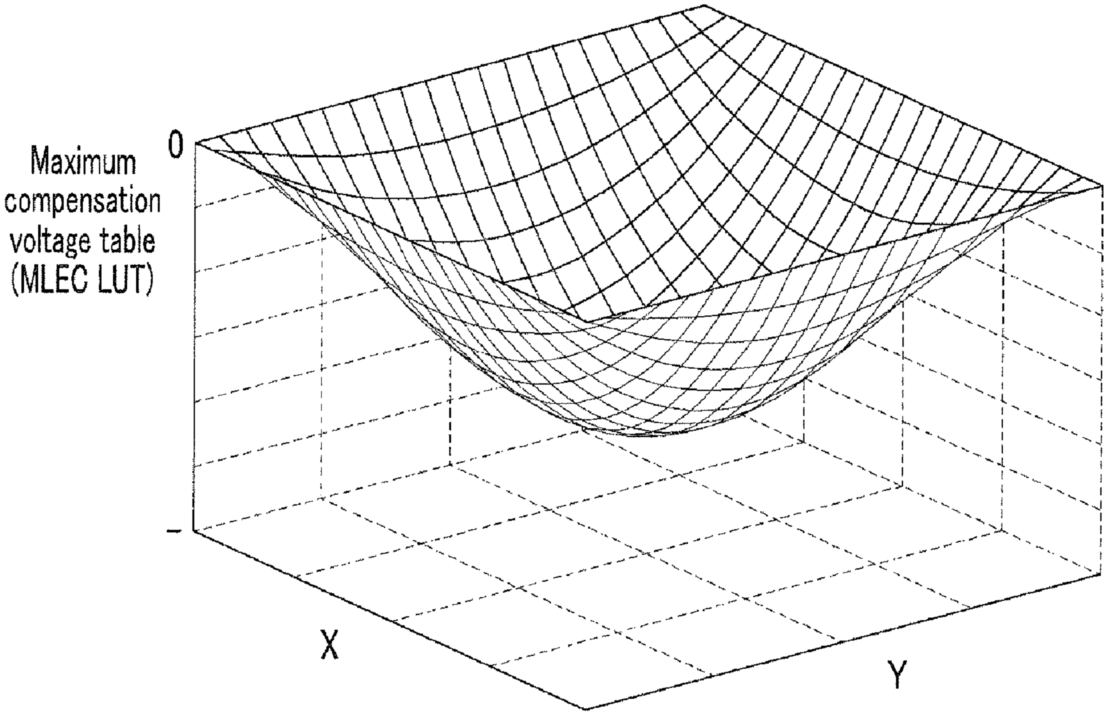
Figure 6:
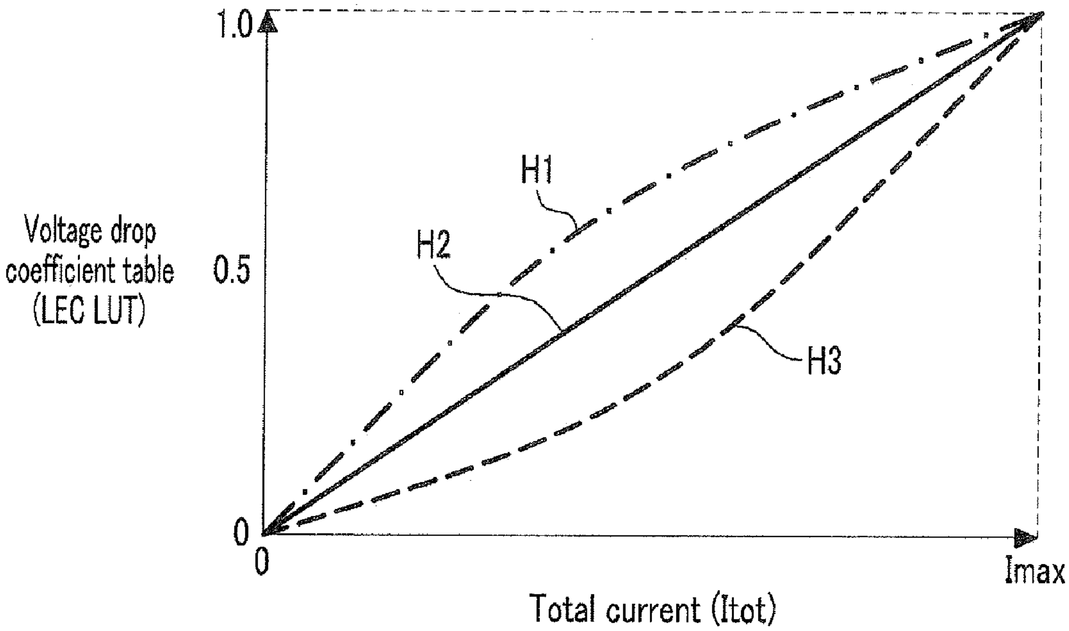
FIG. 6 is a graph showing voltage drop coefficients with respect to total output currents of one frame of a display device according to an embodiment of the present invention.

FIG. 1 is a block diagram of a display device according to an embodiment of the present invention, FIG. 2 is a block diagram showing a voltage drop compensation system of a display device according to an embodiment of the present invention, FIG. 3 is a graph showing gamma data for red, green, and blue, FIG. 4 and FIG. 5 are graphs showing a maximum compensation voltage table (MLEC LUT) according to XY positions of a display device according to an embodiment of the present invention, respectively, and FIG. 6 is a graph showing a voltage drop coefficient table (LEC LUT) with respect to total output currents of one frame of a display device according to an embodiment of the present invention.

Referring to FIG. 1, a display device according to an embodiment of the present invention includes a display panel 300, a scan driver 400, a data driver 500, an input signal input section 550, a voltage drop compensation system 600, a memory 700, a gamma converter 800, and a signal controller 900.

From the viewpoint of an equivalent circuit, the display panel 300 includes a plurality of signal lines $G_1$-$G_n$ and $D_1$-$D_m$ and a plurality of pixels PX that are connected to the signal lines and arranged in an approximate matrix form.

The signal lines $G_1$-$G_n$ and $D_1$-$D_m$ include a plurality of scanning signal lines $G_1$-$G_n$ transferring a scan signal and approximately extending in an X direction, and a plurality of data lines $D_1$-$D_m$ transferring a data signal and approximately extending in a Y direction.

Each pixel PX may include a switching element (not shown) connected to the corresponding scanning signal lines $G_1$-$G_n$ and the corresponding data lines $D_1$-$D_m$, and an electro-optic converting element (not shown). The switching element (not shown) transmits a data voltage applied to the data lines $D_1$-$D_m$ to the electro-optic converting element in response to a scanning signal applied to the scanning signal lines $G_1$-$G_n$. The electro-optic converting element (not shown) converts the data voltage into light, thereby displaying images having a desired luminance. An example of the electro-optic converting element is a liquid crystal capacitor of a liquid crystal display, or an organic light emitting diode of an organic light emitting device (OLED).

XY coordinates of the pixel PX in the display panel 300 may be determined by the scanning signal lines $G_1$-$G_n$ and the data lines $D_1$-$D_m$ connected to each pixel PX. For example, the XY coordinates of the pixel PX connected to the i-th scanning signal line $G_i$ (i=1, 2, . . . , n) and the j-th data line $D_j$ (j=1, 2, . . . , m) may be referred to as (i, j).

For color display, each pixel PX uniquely displays one of three primary colors (spatial division) or each pixel PX alternately displays the three primary colors (temporal division) as time passes, and a desired color is recognized by a spatial or temporal sum of the primary colors. For example, the primary colors are three primary colors of red, green, and blue.

The scan driver 400 is connected to the scanning signal line $G_1$ to $G_n$ of the display panel 300, and applies gate signals obtained by combining a high voltage and a low voltage to the scanning signal lines $G_1$ to $G_n$.

The data driver 500 is connected to the data lines $D_1$ to $D_m$ of the display panel 300, and applies data voltages from the signal controller 900 to the data line $D_1$-$D_m$.

The signal controller 900 controls the operation of the scan driver 400 and the data driver 500.

The signal input section 550 is supplied with input image signal Din for R, G, and B and input control signal ICON for controlling the display thereof from the outside to respectively transfer them to the gamma converter 800 and the voltage drop compensation system 600. The input image signals Din contain luminance information of each pixel PX. The luminance has a predetermined number of grays, such as $1024=2^{10}$, $256=2^8$, or $64=2^6$. The input control signals ICON include, for example, a vertical synchronization signal, a horizontal synchronization signal, a main clock signal, and a data enable signal.

The gamma converter 800 converts the gray of the input image signal Din from the signal input section 550 into pre-compensation data voltages Vd' assuming that there is no voltage drop in the display panel 300, and outputs the pre-compensation data voltages Vd' to the voltage drop compensation system 600.

The voltage drop compensation system 600 calculates data voltage drop values according to the XY positions of the display panel 300, and adds the data voltage drop values to the pre-compensation data voltages Vd' from the gamma converter 800 to generate post-compensation data voltages Vd".

The memory 700 stores gamma data GM for each of red R, green G, and blue B, a maximum compensation voltage table MLEC LUT, and a voltage drop coefficient table LEC LUT. The memory 700 supplies the gamma data GM to the gamma converter 800 and the maximum compensation voltage table MLEC LUT and the voltage drop coefficient table LEC LUT to the voltage drop compensation system 600. The memory 700 may be an EEPROM, and the gamma data GM, the maximum compensation voltage table MLEC LUT, and the voltage drop coefficient table LEC LUT may be stored as a lookup table LUT.

The gamma data GM is information representing the pre-compensation data voltages Vd' or currents for all grays without consideration of any voltage drop in the display panel 300. The gamma data GM is previously determined suitably for the characteristics of the display panel 300 so that the luminance of an image displayed by the display device may have a desired value. The gamma data GM are input to the gamma converter 800 and the voltage drop compensation system 600. FIG. 3 is one example of the gamma data GM for each of the red R, the green G, and the blue B. The gamma data GM for each of the red R, the green G, and the blue B may be different from each other.

The maximum compensation voltage table MLEC LUT represents voltage drop values for a predetermined portion of the display panel 300 when the data voltage drop according to the positions of the predetermined portion of the display panel 300 is a maximum, such as the case in which the maximum output currents flow in the display panel 300. Referring to FIG. 4, the value of the maximum compensation voltage table MLEC LUT may be positive with respect to a reference voltage such as the common voltage, or may be negative as shown in FIG. 5, and may be different according to red R, green G, and blue B. In FIG. 4 and FIG. 5, even though the values of the maximum compensation voltage table MLEC LUT are shown to be continuous according to the XY coordinates, values for a predetermined portion of the display panel 300 may be included so as to thereby reduce the size of the memory 700. Referring to FIG. 4 and FIG. 5, the value of the maximum compensation voltage table MLEC LUT generally becomes greater going from the edge portion to the central portion of the display panel 300. The maximum compensation voltage table MLEC LUT may depend on characteristics of the display panel 300, and is previously determined.

The voltage drop coefficient table LEC LUT represents coefficients representing the degree of a loading effect, that may be a voltage drop, for a total output current Itot flowing in the display panel 300 per one frame. The voltage drop coefficient LEC is 0 when the total output current Itot of the display panel 300 is 0, and it is 1 when the total output current Itot is a maximum Imax. The curves H1, H2, and H3 of FIG. 6 respectively show examples of the voltage drop coefficient table LEC LUT for different display panels 300, and may be variously changed according to the characteristics of the display panel 300 such as the characteristics of the thin film transistor and the emitting light efficiency. The voltage drop coefficient LEC may be also different according to each primary color of red R, green G, and blue B.

Next, the voltage drop compensation system 600 will be described with reference to FIG. 2.

Referring to FIG. 2, the voltage drop compensation system 600 includes a current adder 610, an XY position calculator 620, a coefficient calculator 640, a maximum compensation voltage calculator 650, a multiplier 660, and an adder 670.

The current adder 610 converts the input image signals Din for all pixels PX that are input from the signal input section 550 during one frame into currents and adds them up to obtain a total output current Itot, and outputs the total output current Itot to the coefficient calculator 640. In the case of an organic light emitting device, the total output current Itot may be a sum of driving currents flowing through organic light emitting diodes each of which is included in each pixel PX.

The XY position calculator 620 obtains the information Fxy for the XY coordinates of the display panel 300 corresponding to the input image signal Din input from the signal input section 550 to output it to the maximum compensation voltage calculator 650. The XY coordinates corresponding to the input image signal Din as the XY coordinates of the corresponding pixel PX may be determined by the scanning signal lines $G_1$-$G_n$ and the data lines $D_1$-$D_m$ connected to the corresponding pixel PX, as described above.

The maximum compensation voltage calculator 650 obtains the maximum compensation voltages V_MLEC, which are voltage drop values when the voltage drop is a maximum at all positions of the display panel 300, using the maximum compensation voltage table MLEC LUT for a predetermined portion of the display panel 300 that is input from the memory 700. Here, the maximum compensation voltages V_MLEC for the remaining positions of the display panel 300 may be obtained through interpolation using the maximum compensation voltage table MLEC LUT.

The coefficient calculator 640 obtains a voltage drop coefficient LEC for the corresponding frame based on the total output current Itot for one frame input from the current adder 610 and the voltage drop coefficient table LEC LUT input from the memory 700.

The multiplier 660 respectively multiplies the maximum compensation voltage V_MLEC for red R, green G, and blue B from the maximum compensation voltage calculator 650 by the voltage drop coefficient LEC for red R, green G, and blue B from the coefficient calculator 640 to obtain the voltage drop compensation voltages V_LEC of the corresponding frame.

The adder 670 receives the voltage drop compensation voltages V_LEC from the multiplier 660 to add them to the pre-compensation data voltages Vd' from the gamma converter 800. Accordingly, changes such as a voltage drop due to a loading effect according to the positions of the display panel 300 may be compensated in one frame.

Next, a display operation including the voltage drop compensation method of a display device will be described.

The signal input section 550 receives the input image signal Din and the input control signal ICON from an external graphics controller (not shown), and outputs them to the current adder 610 and the XY position calculator 620 of the gamma converter 800 and the voltage drop compensation system 600.

The memory 700 supplies the gamma data GM to the gamma converter 800 and the current adder 610, the voltage drop coefficient table LEC LUT to the coefficient calculator 640, and the maximum compensation voltage table MLEC LUT to the maximum compensation voltage calculator 650.

The gamma converter 800 converts the input image signal Din as a digital signal into a pre-compensation data voltage {Vd'=GM(Din)} according to each gamma data GM for red R, green G, and blue B, and outputs it to the multiplier 660 of the voltage drop compensation system 600.

The current adder 610 converts the input image signal Din to a current according to each gamma data GM for red R, green G, and blue B and adds up the currents to obtain the total output current Itot for all pixels PX for one frame, and to output the total output current Itot to the coefficient calculator 640.

The coefficient calculator 640 obtains the voltage drop coefficient {LEC=LEC LUT(Itot)} corresponding to the total output current Itot for the corresponding frame from the voltage drop coefficient table LEC LUT, and outputs the voltage drop coefficient LEC to the multiplier 660.

The XY position calculator 620 obtains the information Fxy for the XY coordinates of the input image signal Din and outputs it to the maximum compensation voltage calculator 650.

The maximum compensation voltage calculator 650 obtains the maximum compensation voltages V_MLEC of all positions of the display panel 300 corresponding to the input image signal Din through interpolation using the maximum compensation voltage table MLEC LUT for a predetermined portion of the display panel 300, and outputs the maximum compensation voltages V_MLEC to the multiplier 660.

The multiplier 660 multiplies the maximum compensation voltages V_MLEC of all positions of the display panel 300 corresponding to the input image signals Din by the voltage drop coefficient LEC to obtain the voltage drop compensation voltages V_LEC, and outputs the voltage drop compensation voltages V_LEC to the adder 670.

The adder 670 adds the voltage drop compensation voltage V_LEC to the pre-compensation data voltage Vd' from the gamma converter 800 to generate the post-compensation data voltage Vd", and outputs the post-compensation data voltage Vd" to the signal controller 900 along with the input control signal ICON.

The process of obtaining the post-compensation data voltage Vd" from the input image signal Din may be represented by the following Equation 1.

$$Vd''=GM(D\text{in})+V\_MLEC(X,Y)*LEC\,LUT(I\text{tot}) \quad \text{(Equation 1)}$$

Next, the signal controller 900 appropriately processes the post-compensation data voltages Vd" based on the post-compensation data voltages Vd" and the input control signals ICON according to the structure of the display panel 300 and the operating conditions thereof to generate data voltages Vd, and generates the scan control signals CONT1 and the data control signals CONT2. The signal controller 900 outputs the scan control signal CONT1 to the scan driver 400, and the data control signal CONT2 and the data voltage Vd to the data driver 500.

The data driver 500 applies the data voltage Vd to the data line $D_1$-$D_m$ according to the data control signals CONT2, and the scan driver 400 applies the scanning signal to the scanning signal line $G_1$-$G_n$ according to the scan control signals CONT1, and thereby the data voltage Vd is applied to each pixel PX.

The voltage applied to each pixel PX is converted to light of a corresponding gray through the electro-optic converting element, thereby displaying images on the display panel 300.

According to an embodiment of the present invention, the voltage that will be dropped according to positions of the display panel 300 is previously calculated and the calculated voltages are added to the gamma converted pre-compensation data voltages, and therefore, loading effects such as voltage drops according to positions of the display panel 300 by RC delay or the like may be compensated, thereby displaying uniform luminance with respect to position. Voltage drop compensation as described above is separately executed for each of the primary colors of the red R, the green G, and the blue B such that uniform color may be displayed according to position of the display panel 300. In an embodiment of the present invention, since the maximum compensation voltage table MLEC LUT for a portion of the display panel 300 when a maximum current flows in the display panel 300 is used, the capacity of the memory 700 may be reduced. When a current that is not a maximum flows through the display panel 300, the voltage drop coefficient LEC is used for obtaining the voltage drop compensation voltage. The voltage drop compensation voltage for the position which is not included in the maximum compensation voltage table MLEC LUT may be simply calculated through interpolation such that the voltage drop compensation method may be more quickly executed and the capacity of the memory 700 may be reduced.

Figure 7:
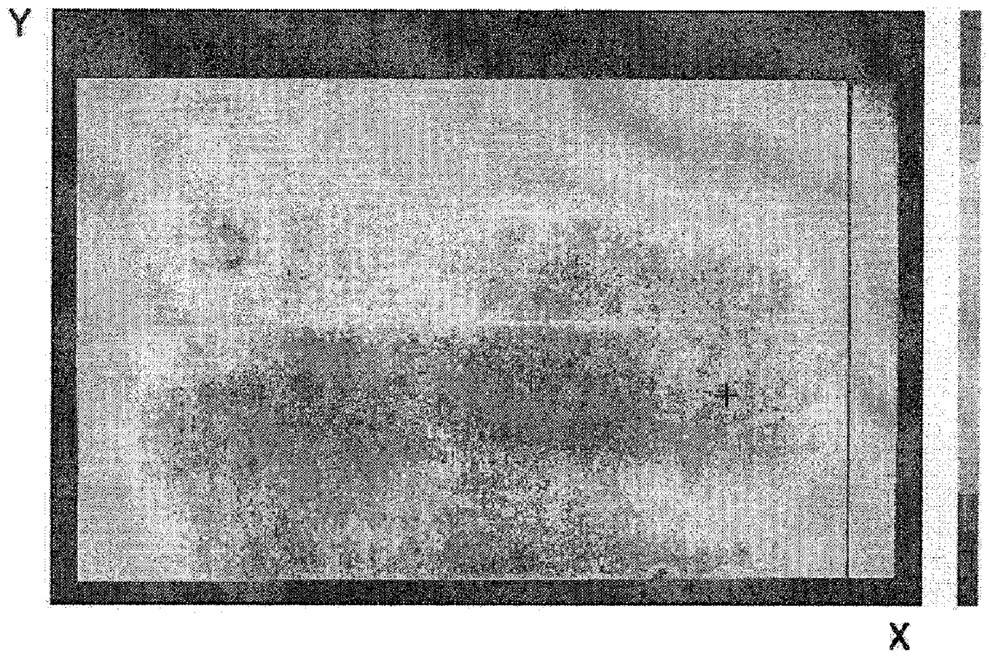
FIG. 7 is a view showing an image display screen of a display device without a voltage drop compensation system.
Figure 8:
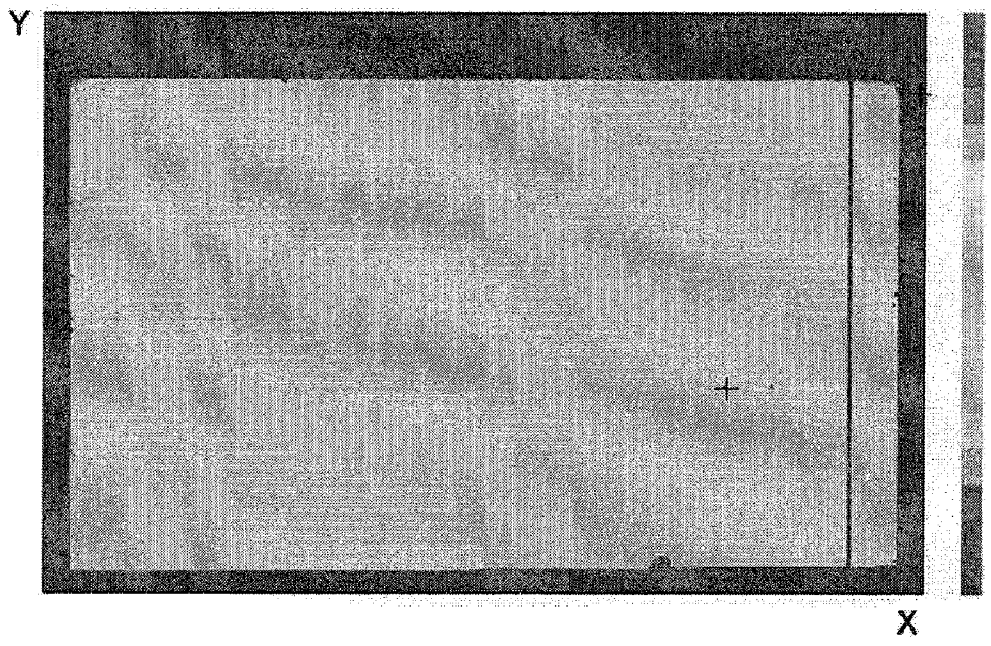
FIG. 8 is a view showing an image display screen of a display device including a voltage drop compensation system according to an embodiment of the present invention.

FIG. 7 is a view showing an image display screen of a display device without a voltage drop compensation system, and FIG. 8 is a view showing an image display screen of a display device including a voltage drop compensation system according to an embodiment of the present invention.

Referring to FIG. 7, when a voltage drop compensation method according to an embodiment of the present invention is not applied, the images of the non-uniform luminance or the non-uniform color are displayed according to the positions on the display panel 300, although the display panel 300 displays the images having the same luminance. Particularly, as the position approaches the central portion of the display panel 300 far away from the data driver 500, the loading effect, that is the voltage drop, is relatively high. However, referring to FIG. 8, when the voltage drop compensation system using the voltage drop compensation method according to an embodiment of the present invention is used, uniform luminance and color are displayed regardless of the XY positions of the display panel 300.

In the present embodiment, a loading effect such as a voltage drop due to an RC delay in a display panel 300 was explained. However the present invention is not limited thereto, and any voltage rise or drop according to positions of a display panel 300 may be compensated through the same method as described above so that uniform luminance and color may be displayed.

The display device according to an embodiment of the present invention may be various display devices such as an organic light emitting device or a liquid crystal display.

According to an embodiment of the present invention, the luminance and color of the display device may be made uniform throughout a display device. Also, the capacity of a memory of a voltage drop compensation system may be reduced.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method for compensating a voltage drop of a display device including a display panel, a maximum compensation voltage table MLEC LUT for voltage compensation when a voltage drop is a maximum in the display panel, and a voltage drop coefficient table LEC LUT representing voltage drop coefficients with respect to total output currents during one frame, the method comprising:
- receiving an input image signal;
- gamma-converting the input image signal to obtain a pre-compensation data voltage;
- obtaining a first total output current flowing in all pixels PX of the display panel during one frame based on the input image signal;
- obtaining a first voltage drop compensation voltage V_LEC based on the voltage drop coefficient table LEC LUT and the maximum compensation voltage table MLEC LUT; and
- adding the first voltage drop compensation voltage V_LEC to the pre-compensation data voltage to obtain a post-compensation data voltage.

2. The method of claim 1, wherein the obtaining of the first voltage drop compensation voltage V_LEC comprises:
- obtaining a first voltage drop coefficient LEC corresponding to the first total output current from the voltage drop coefficient table LEC LUT;
- obtaining a first maximum compensation voltage V_MLEC from the maximum compensation voltage table MLEC LUT; and
- multiplying the first maximum compensation voltage V_MLEC by the first voltage drop coefficient LEC.

3. The method of claim 2, further comprising obtaining XY coordinates of the input image signal in the display panel.

4. The method of claim 3, wherein the obtaining of the first maximum compensation voltage V_MLEC comprises obtaining the first maximum compensation voltage V_MLEC corresponding to the XY coordinates of the input image signal using the maximum compensation voltage table MLEC LUT.

5. The method of claim 4, wherein the maximum compensation voltage table MLEC LUT comprises a maximum compensation voltage for a position of a portion of the display panel.

6. The method of claim 5, wherein the obtaining of the first maximum compensation voltage V_MLEC corresponding to the XY coordinates of the input image signal comprises using interpolation.

7. The method of claim 1, further comprising providing gamma data, wherein the obtaining of the pre-compensation data voltage based on the input image signal comprises using the gamma data.

8. The method of claim 7, wherein the gamma data is separately provided for each primary color including red, green, and blue.

9. The method of claim 1, wherein at least one of the maximum compensation voltage table MLEC LUT and the voltage drop coefficient table LEC LUT is separately provided for each primary color including red, green, and blue.

10. A system for voltage drop compensation, comprising:
- a current adder receiving an input image signal and obtaining a first total output current flowing in all pixels PX of a display panel during one frame;
- a coefficient calculator obtaining a first voltage drop coefficient LEC corresponding to the first total output current using a voltage drop coefficient table LEC LUT representing voltage drop coefficients with respect to total output currents during one frame;
- a maximum compensation voltage calculator obtaining a first maximum compensation voltage V_MLEC using a maximum compensation voltage table MLEC LUT for voltage compensation when a voltage drop of the display panel is a maximum;
- a multiplier multiplying the first maximum compensation voltage V_MLEC by the first voltage drop coefficient LEC to obtain a first voltage drop compensation voltage V_LEC; and
- an adder receiving a pre-compensation data voltage and adding the first voltage drop compensation voltage V_LEC to the pre-compensation data voltage to obtain a post-compensation data voltage.

11. The system of claim 10, further comprising:
- an XY position calculator receiving the input image signal to obtain XY coordinates of the input image signal in the display panel.

12. The system of claim 11, wherein the first maximum compensation voltage V_MLEC is a maximum compensation voltage corresponding to the XY coordinates of the input image signal.

13. The system of claim 12, wherein the maximum compensation voltage table MLEC LUT comprises a maximum compensation voltage for a position of a portion of the display panel.

14. The system of claim 13, wherein the maximum compensation voltage calculator obtains the first maximum compensation voltage V_MLEC through interpolation using the maximum compensation voltage table MLEC LUT.

15. The system of claim 10, wherein the current adder uses a gamma data.

16. The system of claim 10, wherein at least one of the maximum compensation voltage table MLEC LUT and the voltage drop coefficient table LEC LUT is separately provided for each primary color including red, green, and blue.

17. A display device comprising:
- a display panel;
- a data driver transmitting a data voltage to the display panel;
- a memory storing a voltage drop coefficient table LEC LUT representing voltage drop coefficients with respect to total output currents during one frame, and a maximum compensation voltage table MLEC LUT for voltage compensation when a voltage drop of the display panel is a maximum;

a gamma converter receiving an input image signal and gamma-converting the input image signal into a pre-compensation data voltage;

a voltage drop compensation system obtaining a first voltage drop compensation voltage (V_LEC) according to an XY position in the display panel using the voltage drop coefficient table LEC LUT and the maximum compensation voltage table MLEC LUT, and adding the first voltage drop compensation voltage V_LEC to the pre-compensation data voltage to generate a post-compensation data voltage; and a signal controller processing the post-compensation data voltage to generate a data voltage and outputting the data voltage to the data driver.

18. The display device of claim 17, wherein the voltage drop compensation system comprises:

a current adder receiving an input image signal and obtaining a first total output current flowing in all pixels PX of the display panel during one frame;

a coefficient calculator obtaining a first voltage drop coefficient LEC corresponding to the first total output current using a voltage drop coefficient table LEC LUT representing voltage drop coefficients with respect to total output currents during one frame;

a maximum compensation voltage calculator obtaining a first maximum compensation voltage V_MLEC using a maximum compensation voltage table MLEC LUT for voltage compensation when a voltage drop of the display panel is a maximum;

a multiplier multiplying the first maximum compensation voltage V_MLEC by the first voltage drop coefficient LEC to obtain a first voltage drop compensation voltage V_LEC; and an adder receiving the pre-compensation data voltage and adding the first voltage drop compensation voltage V_LEC to the pre-compensation data voltage to obtain a post-compensation data voltage.

19. The display device of claim 18, wherein the voltage drop compensation system further comprises an XY position calculator receiving the input image signal to obtain XY coordinates of the input image signal in the display panel.

20. The display device of claim 17, wherein the memory further stores gamma data for converting the input image signal into the pre-compensation data voltage.

21. The display device of claim 17, wherein at least one of the maximum compensation voltage table MLEC LUT and the voltage drop coefficient table LEC LUT is separately provided for each primary color including red, green, and blue.

* * * * *